United States Patent [19]

Saad et al.

[11] Patent Number: 4,780,338

[45] Date of Patent: Oct. 25, 1988

[54] SOLVENTLESS SILICONE COATING COMPOSITION

[75] Inventors: William T. Saad, Burnt Hills; George F. Medford, Ballston Lake, both of N.Y.

[73] Assignee: General Electric Company, Waterford, N.Y.

[21] Appl. No.: 30,955

[22] Filed: Mar. 26, 1987

[51] Int. Cl.$^4$ .............................................. B05D 3/02
[52] U.S. Cl. .................... 427/387; 428/447; 528/15; 528/16; 528/17; 528/18; 528/19; 528/21; 528/33; 528/41; 528/901

[58] Field of Search ............ 528/41, 33, 17, 18, 528/15, 19, 21, 16, 901; 427/387; 428/447

[56] References Cited

U.S. PATENT DOCUMENTS

| | | | |
|---|---|---|---|
| 4,443,502 | 4/1984 | Gutek | 528/33 |
| 4,503,209 | 3/1985 | Lucas | 528/17 |
| 4,593,085 | 6/1986 | Lucas | 528/18 |

Primary Examiner—Melvyn I. Marquis

[57] ABSTRACT

Solventless silicone coating compositions are disclosed which contain a fluid silicone resin and a polydiorganosiloxane fluid.

46 Claims, No Drawings

SOLVENTLESS SILICONE COATING COMPOSITION

The present invention relates to solventless silicone coating compositions. More particularly, the present invention relates to solventless silicone coating compositions containing certain silicone resins and silicone fluid.

BACKGROUND OF THE INVENTION

Silicone compositions are used in a variety of protective coating applications. Silicone compositions are particularly suited for applications where the substrate is to be exposed to high temperatures, that is temperatures in the range of 500° to about 1000° F. Such temperatures would accelerate degradation of, for instance, ordinary acrylic or epoxy resins.

Generally silicone coating compositions are produced from silicone resins which are highly branched and crosslinked silicone polymers. To these silicone resins, polydiorganosilicone fluids are added to modify certain properties of the resin. Polydiorganosiloxane fluids are substantially linear silicone polymers having functional groups which will react with the silicone resin.

Stricter environmental regulation has been enacted in recent years that has placed pressure on the coatings industry to remove solvents from coating formulations. Silicone coating compositions have in the past been applied at from about 20 to about 90% by weight solvent. Thus, it is a problem in such compositions that the solvent be removed.

It is an object of the present invention to produce solventless silicone coating compositions.

It is a further object of the present invention to produce solventless silicone coating compositions containing silicone resins and silicone fluids.

SUMMARY OF THE INVENTION

Briefly, according to the present invention, there is provided a coating composition useful at high temperatures comprising:

(a) 100 parts by weight at least one silicone resin having alkoxy or acyloxy functional groups and a viscosity of from about 10 to about 200,000 centipoise at 25° C., (b) from about 5 to about 2000 parts by weight of at least one polydiorganosiloxane fluid having a viscosity between about 5 and 5,000 centipoise at 25° C. and having functional groups which will react with the alkoxy or acyloxy functional groups of the silicone resin, and (c) an effective amount of condensation catalyst to cure the composition.

DETAILED DESCRIPTION OF THE INVENTION

The silicone resins suitable for use herein have a viscosity of from about 10 to about 200,000 centipoise at 25° C., and preferably, a viscosity of from about 25 to about 2500 centipoise at 25° C. Such resins generally have from about 0 to about 10% by weight hydroxy functional groups, from about 0 to about 30% by weight molar equivalent methoxy groups of alkoxy or acyloxy functional groups and may be broadly described by the general formula:

$$R_aSiO_{(4-a)/2} \qquad (1)$$

wherein R is a substituted or unsubstituted hydrocarbon radical of from 1 to about 10 carbon atoms, and "a" is on average from about 0.75 to about 1.9, and more preferably, from about 0.9 to about 1.5, Examples of hydrocarbon radicals included by R are alkyl radicals such as methyl, ethyl, n-propyl, isopropyl, n-butyl and sec-butyl radicals as well as octyl radicals; cycloalkyl radicals such as the cyclopentyl, cyclohexyl and cycloheptyl radicals; alkenyl radicals such as the vinyl and allyl radicals; aryl radicals such as the phenyl radical; alkaryl radiicals such as the tolyl radical; and aralkyl radicals such as the benzyl radical. Examples of substituted hydrocarbon radicals represented by R are the halogenated monovalent hydrocarbon radicals such as the 1,1,1-trifluoropropyl and the alpha, alpha, alpha-trifluorotolyl radical as well as chlorophenyl and dichlorophenyl radicals and verious other radicals not interfering with resin manufacture, including acryloxypropyl, glycidoxypropyl, gamma-aminopropyl, etc. However, because they are more readily available, it is preferred that at least 85 percent of the R radicals be methyl or phenyl radicals and that at least 50 percent of the R radicals be methyl radicals. Preferred alkoxy or acyloxy functional groups are silicon bonded alkoxy groups and silicon bonded acyloxy groups having from 1 to about 8 carbon atoms.

Preferred silicone resins may be classified as either MQ resins, that is resins containing $R_3SiO_{\frac{1}{2}}$ and $SiO_{4/2}$ units, or DT resins, that is resins containing $R_2SiO_{2/2}$ and $RSiO_{3/2}$ units. It is especially preferred that the instant invention be practiced with DT resins.

An MQ resin is a copolymer having $R_3SiO_{0.5}$ and $SiO_2$ units wherein the number ratio of $R_3SiO_{0.5}$ to $SiO_2$ units is from about 0.25:1 to about 2:1. MDQ resins are copolymers having $R_3SiO_{0.5}$ units, $R_2SiO$ units, and $SiO_2$ units, wherein the ratio of $R_3SiO_{0.5}$ to $SiO_2$ units is from about 0.25:1 to about 0.8:1 and the ratio of $R_2SiO$ units to $SiO_2$ units can be up to about 0.1:1. In the foregoing formulas, R can be any alkyl radical, aryl radical, aralkyl radical, alkaryl radical, alkenyl radical, or a halogen or cyano derivative thereof as described above. The manufacture of solid MQ resins is well known to persons skilled in the art through various U.S. Patents. The teachings of such patents can be adapted to produce MQ resins meeting the requirements herein.

A DT resin is a copolymer having $R_2SiO_{2/2}$ and $RSiO_{3/2}$ units wherein the ratio of D to T units is from about 0:1 to about 1.5:1 and preferably from about 0.05:1 to about 1:1. Suitable DT resins as well as their methods of preparation are well known and persons skilled in the art can readily adapt the prior art teachings to produce such resins.

As stated above, silicone resins suitable for use herein have from about 0 to about 10% by weight hydroxy functional groups and from about 0 to about 30% by weight molar equivalent methoxy group of alkoxy or acyloxy functional groups. The weight of molar equivalent methoxy groups may be derived by substituting actual acyloxy or alkoxy functional groups with equimolar theoretical methoxy groups. As a general rule, a silicone resin which has a high proportion of hydroxy functional groups will be solid at room temperature. On the other hand, depending upon molecular weight, a silicone resin having an increased number of alkoxy or acyloxy functional groups has an increased tendency to be liquid at room temperature. Thus, it is essential to the resins used herein that there be at least a sufficient amount of alkoxy or acyloxy functionality or a sufficient ratio of alkoxy or acyloxy functional groups to hydroxy functional groups on a resin to produce a resin within the required viscosity range. Further, for any given alkoxy or acyloxy functional group content, it is essential that the molecular weight of the resin be sufficiently low that the viscosity limitations are met. It is preferred for use herein, that the silicone resin contain from about 0 to about 5% by weight hydroxy functional groups and from about 10% to about 25% by weight molar equivalent methoxy groups of alkoxy or acyloxy functional groups. Preferred molecular weight will practically vary as a function of the average value of "a" in formula 1 above and the hydroxy, alkoxy, and acyloxy content. The most preferred embodiments of the invention utilize methoxy groups or a mixture of methoxy and hydroxy groups as the reactive functional group of the silicone resin.

The polydiorganosiloxane fluid can be any substantially linear silicone polymer which contains functional groups which will react with the functional groups of the silicone resin. These polydiorganosiloxane fluids and their methods of manufacture are well known to those of ordinary skill in the art. Preferably, the reactive functional groups will be, for example silanol, alkoxy, acyloxy and the like.

Especially preferred polydiorgansiloxane fluids contain terminal reactive functional groups and preferably are of the general formula:

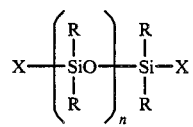

(2)

where R is independently selected and defined above; X is hydroxy, alkoxy and acyloxy; and n is an integer such that the viscosity of the polydiorganosiloxane is from about 5 centipoise to about 5,000 centipoise at 25° C. In more preferred embodiments of the present invention the viscosity of the polydiorganosiloxane fluid is from about 10 centipoise to about 1000 centipoise at 25° C. and, most preferably, is from about 20 centipoise to about 500 centipoise as 25° C.

To form the coating compositions herein, the polydiorganosiloxane fluid should be compatible with the silicone resin in order to obtain optimum properties in the cured coating. When the polydiorganosiloxane fluid and silicone resin are compatible, a clear composition is formed and no phase separation is observed. Compatibility of the resin and fluid is improved where substantially the same R groups or organo substituents are present on each. For example, where the resin contains phenyl groups, compatibility will be improved where the fluid is phenyl containing. Compatibility is also improved upon decreasing the silicone chain length of the fluid. Persons skilled in the art can simply and easily recognize an incompatible composition from a compatible composition.

X in the formula 2 can be, for example, hydroxy, methoxy, propoxy, butoxy, acetoxy, or the like, recognizing that any group other than hydroxy should not be so difficult to react that reaction rates are unreasonably slow. It should also be understood, however, that the fastest rate of reaction is not necessarily the best, for example, in the case of a paint formulation wherein a slower reacting paint gives a higher gloss in the cured state than a faster curing paint.

To form coating compositions of the instant invention, it is necessary to blend sufficient silicone resin with sufficient polydiorganosiloxane fluid to form a coating composition. Persons skilled in the art are well able to determine a proper proportion of the two principal ingredients to obtain desired properties. For instance, greater flexibility may be desired in the cured coating and thus fluid content may be increased or it may be desired to increase the hardness of the cured coating and thus resin content may be increased. Broadly, it is recommended that from about 5 to about 2000 parts by weight polydiorganosiloxane fluid be added for each 100 parts by weight silicone resin. However, preferred coating compositions herein contain from about 50 to about 1000 parts by weight fluid for each 100 parts by weight of resin. It has been found to be particularly advantageous to produce a coating composition having from about 200 to about 1000 parts by weight fluid for each 100 parts by weight resin.

Suitable condensation catalysts may be the same as those which have been employed heretofore in the production of coatings from thermosetting organopolysiloxane compositions. Examples of suitable condensation catalysts are lead compounds such as lead carbonate, basic lead carbonate, i.e., a compound corresponding to the formula $Pb_3(OH)_2(CO_3)_2$, lead monoxide, lead dioxide and lead naphthenate, as well as carboxylic acid salts of zirconium, calcium, aluminum, iron, zinc, tin, cobalt and/or cerium, such as zirconium-2-ethylhexoate, zinc naphthenate, zinc-2-ethylhexoate, tin octoate, dibutyltin diacetate, cobalt octoate, ferric naphthenate, calcium stearate, cobalt naphthenate, aluminum naphthenate, cerium octoate and cerium naphthenate; quaternary ammonium compounds such as tetramethylammoniumacetate; and metal alcoholates such as aluminum isopropylate and polymeric butyltitanate. Mixtures of various condensation catalysts may also be employed. When condensation catalysts are used, they may be employed in the same amounts as those used heretofore in the manufacture of coatings from thermosetting compositions containing organopolysiloxanes and condensation catalysts. Generally, an effective amount of condensation catalyst will range from about 0.005 to 5 percent by weight metal based on the weight of total organopolysiloxanes.

Pigments, reinforcing agents, and/or UV screens, etc., may be added according to the skill of the art. Of course, the amounts of each to be added must be reconsidered in view of an increased viscosity sensitivity in these solventless compositions. Suitable pigments include titanium dioxide and suitable reinforcing agents include mica.

The solventless curable coating compositions of the present invention are prepared by simply mixing the silicone resin, the polydiorganosiloxane fluid, the condensation catalyst, and pigments. In some instances, mixing can be accomplished by stirring or slight shaking while in other instances, high energy mechanical blending may be required. Should the blend separate prior to use, additional mixing will restore the blend to its original intimately admixed condition. At this point, improved compatibility may also be obtained by partially reacting the fluid and the resin by heating in the presence of a suitable catalyst as appropriate to prevent total reaction. Where the above requirements have been met, no solvent will be required and the coating will be at 100% silicone solids discounting the presence of pigments and the like.

The coating is applied to a substrate by conventional methods, such as dipping, spraying, knifing or the like to a cured thickness of at least about 0.1 mils. It is a particular advantage of these coating compositions that thick section coatings may be applied and cured. Thus, coating thickness of from about 5 to about 125 mil are possible. Following application, curing at elevated temperatures is required. Such further curing is normally accomplished by placing the coated or impregnated substrate in an oven maintained at a temperature of from about 50° C. to about 300° C. for about 1 minute to about 3 hours or by simply heating the substrate to which the coating is applied. It is another advantage of coating compositions herein that they may be heated immediately to cure temperature. Ordinary solvent containing coating compositions must be air dried or dried at temperatures below solvent boiling point before heating to cure temperature. This avoids coating destruction from boiling solvent and the production of large volumes of solvent fumes. Thus, coating methods of the present invention have the advantage of heating the compositions as applied directly to cure temperature or applying the coatings to hot substrates.

Substrates on which the coating compositions of the present invention find the most advantage are those which are exposed to temperatures in excess of about 500° F. Generally, these substrates are metal substrates, such as steel, aluminum, copper and the like. Certain high temperature plastics may also be expected to withstand these temperatures.

Ingredients

Silicone Resin: 92 grams of methyltrimethoxysilane (0.68 mole), 8 grams of dimethyl dimethoxy silane (0.67 mole) and 0.14 grams methyltrichlorosilane (0:0009 mole) was hydrolyzed by the addition of 16.0 grams of water (0.89 mole). The resultant hydrolyzate was neutralized by the addition of 0.3 gram calcium carbonate and was stripped to 65° C. at 200 torr. The resultant resin had a viscosity of 640 centipoise at 25° C.

Polydiorganosiloxane Fluid: silanol stopped dimethylsiloxane fluid having a viscosity of about 20 centipoise at about 25° C.

Catalyst: zinconium octoate, 12% zirconium, percentages which follow for catalyst will be based on metal and on silicone solids of resin and fluid.

EXAMPLES

Examples 1-3

The formulations of the following Table 1 were blended and drawn down on aluminum Q-paint panels to a thickness of about 1 to 1.5 mil. The panels of Examples 1 and 2 were inserted into a 200° C. over for 60 minutes. The panel of Experiment 3 was left for 15 minutes at room temperature and inserted into the oven for 30 minutes at 200° C. followed by 60 minutes at 250° C.

TABLE 1

|  | 1 | 2 | 3 |
|---|---|---|---|
| Silicone Resin | 20 | 10 | 20 |
| Polydiorganosiloxane Fluid | 80 | 90 | 80 |
| Catalyst, % | 0.04 | 0.04 | 0.04 |
| TiO2 | — | — | 113 |
| Mica, (325 mesh) | — | — | 36 |
| Blend Viscosity, centipoise at 25° C. | 27 | — | — |
| Visual Appearance | Clear | Clear | Pigmented |
| Pencil Hardness | 3H | 2H | HB |
| Reverse Impact | 5-10 | 40-60 | 10 |
| Mandrel Flex, inches | ⅜ | ⅛-3/16 | ⅜ |
| Thermal Shock | — | — | 900° C. |

What is claimed is:

1. A solventless composition comprising:
   (a) 100 parts by weight of at least one silicone resin having alkoxy or acyloxy functional groups, a viscosity of from about 5 to about 200,000 centipoise at 25° C., and the general formula:

$$R_aSiO_{(4-a)/2}$$

wherein R is a substituted or unsubstituted hydrocarbon radical having from about 1 to about 10 carbon atoms and "a" is on average from about 0.75 to about 1.9,
   (b) from about 5 to about 2000 parts by weight of at least one polydiorganosiloxane fluid having a viscosity between about 5 and 5,000 centipoise at 25° C. and having functional groups which will react with the alkoxy or acyloxy functional groups of the silicone resin, and
   (c) an effective amount of condensation catalyst to cure the composition.

2. The composition of claim 1 wherein said silicone resin has the general formula:

$$R_aSiO_{(4-a)/2}$$

wherein R is a substituted or unsubstituted hydrocarbon radical having from about 1 to about 10 carbon atoms and "a" is on average from about 0.9 to about 1.5.

3. The composition of claim 1 wherein said silicone resin is a copolymer having $R_2SiO_{2/2}$ and $R\ SiO_{3/2}$ units.

4. The composition of claim 1 wherein said silicone resin contains from about 0 to about 10% by weight hydroxy functional groups and up to about 30% by weight molar equivalent methoxy groups of alkoxy or acyloxy functional groups.

5. The composition of claim 1 wherein said silicone resin contains from about 0 to about 5% by weight hydroxy functional groups and from about 10 to about 25% by weight molar equivalent methoxy groups of alkoxy or acyloxy functional groups.

6. The composition of claim 1 wherein said silicone resin has sufficient alkoxy or acyloxy functionality to control viscosity within the stated range.

7. The composition of claim 4 wherein said silicone resin has a sufficient ratio of alkoxy or acyloxy functional groups to hydroxy functional groups to control viscosity within the stated range.

8. The composition of claim 4 wherein said silicone resin has a sufficient ratio of alkoxy or acyloxy functional groups to hydroxy functional groups and a sufficiently low molecular weight to control viscosity within the stated range.

9. The composition of claim 1 wherein said silicone resin and said polydiorganosiloxane fluid are compatible.

10. The composition of claim 1 wherein the silicone resin and polydiorganosiloxane fluid have substantially the same organo substituents to render said resin and fluid compatible.

11. The composition of claim 1 wherein said polydiorganosiloxane fluid has the general formula:

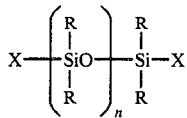

wherein R is a substituted or unsubstituted hydrocarbon radical of from 1 to about 10 carbon atoms; X is selected from the group consisting of hydroxy, alkoxy and acyloxy; and n is an integer to give the stated viscosity.

12. The composition of claim 1, wherein said resin has a viscosity between about 25 and about 2500 centipoise at 25° C.

13. The composition of claim 1 wherein there is present for each 100 parts by weight said silicone resin, from about 50 to about 1000 parts by weight said polydiorganosiloxane fluid.

14. The composition of claim 1 further including pigments, reinforcing agents and/or UV screens.

15. A method for coating substrates comprising:
  (a) applying a solventless composition comprising:
    (i) 100 parts by weight of at least one silicone resin having alkoxy or acyloxy functional groups, a viscosity of from about 10 to about 200,000 centipoise at 25° C., and the general formula:

$R_aSiO_{(4-a)/2}$ wherein R is a substituted or unsubstituted hydrocarbon radical having from about 1 to about 10 carbon atoms and "a" is on average from about 0.75 to about 1.9,
    (ii) from about 5 to about 2000 parts by weight of at least one polydiorganosiloxane fluid having a viscosity between about 5 and 5,000 centipoise at 25° C. and having functional groups which will react with the alkoxy or acyloxy functional groups of the silicone resin, and
    (iii) an effective amount of condensation catalyst to cure the composition; and
  (b) curing said mixture to a substrate by heating.

16. The method of claim 15 wherein said silicone resin has the general formula:

$R_aSiO_{(4-a)/2}$ wherein R is a substituted or unsubstituted hydrocarbon radical having from about 1 to about 10 carbon atoms and "a" is on average from about 0.9 to about 1.5.

17. The method of claim 15 wherein said silicone resin is a copolymer having $R_2SiO_{2/2}$ and $R SiO_{3/2}$ units.

18. The method of claim 15 wherein said silicone resin contains from about 0 to about 10% by weight hydroxy functional groups and up to about 30% by weight molar equivalent methoxy groups of alkoxy or acyloxy functional groups.

19. The method of claim 15 wherein said silicone resin contains from about 0 to about 5% by weight hydroxy functional groups and from about 10 to about 25% by weight molar equivalent methoxy groups of alkoxy or acyloxy functional groups.

20. The method of claim 15 wherein said silicone resin has sufficient alkoxy or acyloxy functionality to control viscosity within the stated range.

21. The composition of claim 19 wherein said silicone resin has a sufficient ratio of alkoxy or acyloxy functional groups to hydroxy functional groups to control viscosity within the stated range.

22. The method of claim 18 wherein said silicone resin has a sufficient ratio of alkoxy or acyloxy functional groups to hydroxy functional groups and a sufficiently low molecular weight to control viscosity within the stated range.

23. The method of claim 15 wherein said silicone resin and said polydiorganosiloxane fluid are compatible.

24. The method of claim 15 wherein the silicone resin and polydiorganosiloxane fluid have substantially the same organo substituents to render said resin and fluid compatible.

25. The method of claim 15 wherein said polydiorganosiloxane fluid has the general formula:

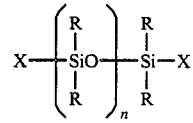

wherein R is a substituted or unsubstituted hydrocarbon radical of from 1 to about 10 carbon atoms; X is selected from the group consisting of hydroxy, alkoxy and acyloxy; and n is an integer to give the stated viscosity.

26. The method of claim 15, wherein said resin has a viscosity between about 25 and about 2500 centipoise at 25° C.

27. The method of claim 15 wherein there is present for each 100 parts by weight said silicone resin, from about 50 to about 1000 parts by weight said polydiorganosiloxane fluid.

28. The method of claim 15 further including pigments, reinforcing agents and/or UV screens.

29. The method of claim 15 wherein said composition is heated directly to cure temperature as applied.

30. The method of claim 15 wherein said composition is applied to a hot substrate.

31. An article comprising a substrate having on the surface thereof a coating comprising the reaction products of
  (a) 100 parts by weight of at least one silicone resin having alkoxy or acyloxy functional groups, a viscosity of from about 10 to about 200,000 centipoise at 25° C., and the general formula:

$R_aSiO_{(4-a)/2}$ wherein R is a substituted or unsubstituted hydrocarbon radical having from about 1 to about 10 carbon atoms and "a" is on average from about 0.75 to about 1.9,
  (b) from about 5 to about 2000 parts by weight of at least one polydiorganosiloxane fluid having a viscosity between about 5 and 5,000 centipoise at 25° C. and having functional groups which will react with the alkoxy or acyloxy functional groups of the silicone resin, and (c) an effective amount of condensation catalyst to cure the composition.

32. The article of claim 31 wherein said silicone resin has the general formula:

$$R_a SiO_{(4-a)/2}$$

wherein R is a substituted or unsubstituted hydrocarbon radical having from about 1 to about 10 carbon atoms and "a" is on average from about 0.9 to about 1.5.

33. The article of claim 31 wherein said silicone resin is a copolymer having $R_2SiO_{2/2}$ and $RSiO_{3/2}$ units.

34. The article of claim 31 wherein said silicone resin contains from about 0 to about 10% by weight hydroxy functional groups and up to about 30% by weight molar equivalent methoxy groups of alkoxy or acyloxy functional groups.

35. The article of claim 31 wherein said silicone resin contains from about 0 to about 5% by weight hydroxy functional groups and from about 10 to about 25% by weight molar equivalent methoxy groups of alkoxy or acyloxy functional groups.

36. The article of claim 31 wherein said silicone resin has sufficient alkoxy or acyloxy functionality to control viscosity within the stated range.

37. The composition of claim 34 wherein said silicone resin has a sufficient ratio of alkoxy or acyloxy functional groups to hydroxy functional groups to control viscosity within the stated range.

38. The article of claim 34 wherein said silicone resin has a sufficient ratio of alkoxy or acyloxy functional groups to hydroxy functional groups and a sufficiently low molecular weight to control viscosity within the stated range.

39. The article of claim 31 wherein said silicone resin and said polydiorganosiloxane fluid are compatible.

40. The article of claim 31 wherein the silicone resin and polydiorganosiloxane fluid have substantially the same organo substituents to render said resin and fluid compatible.

41. The article of claim 31 wherein said polydiorganosiloxane fluid has the general formula:

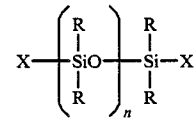

wherein R is a substituted or unsubstituted hydrocarbon radical of from 1 to about 10 carbon atoms; X is selected from the group consisting of hydroxy, alkoxy and acyloxy; and n is an integer to give the stated viscosity.

42. The article of claim 31, wherein said resin has a viscosity between about 25 and about 2500 centipoise at 25° C.

43. The article of claim 31 wherein there is present for each 100 parts by weight said silicone resin, from about 50 to about 1000 parts by weight said polydiorganosiloxane fluid.

44. The article of claim 31 further including pigments, reinforcing agents and/or UV screens.

45. A article of claim 31 wherein said coating has a thickness of from about 5 to about 125 mils.

46. The article of claim 31 wherein said substrate is selected from the group consisting of glass, aluminum, copper, steel and high temperature plastics.

* * * * *